Jan. 9, 1940. W. T. SAGNER 2,186,347
COMBINED TYPEWRITING AND COMPUTING MACHINE
Filed Jan. 19, 1938 7 Sheets-Sheet 1

INVENTOR
WALTER T. SAGNER
BY
L. G. Julihn
ATTORNEY

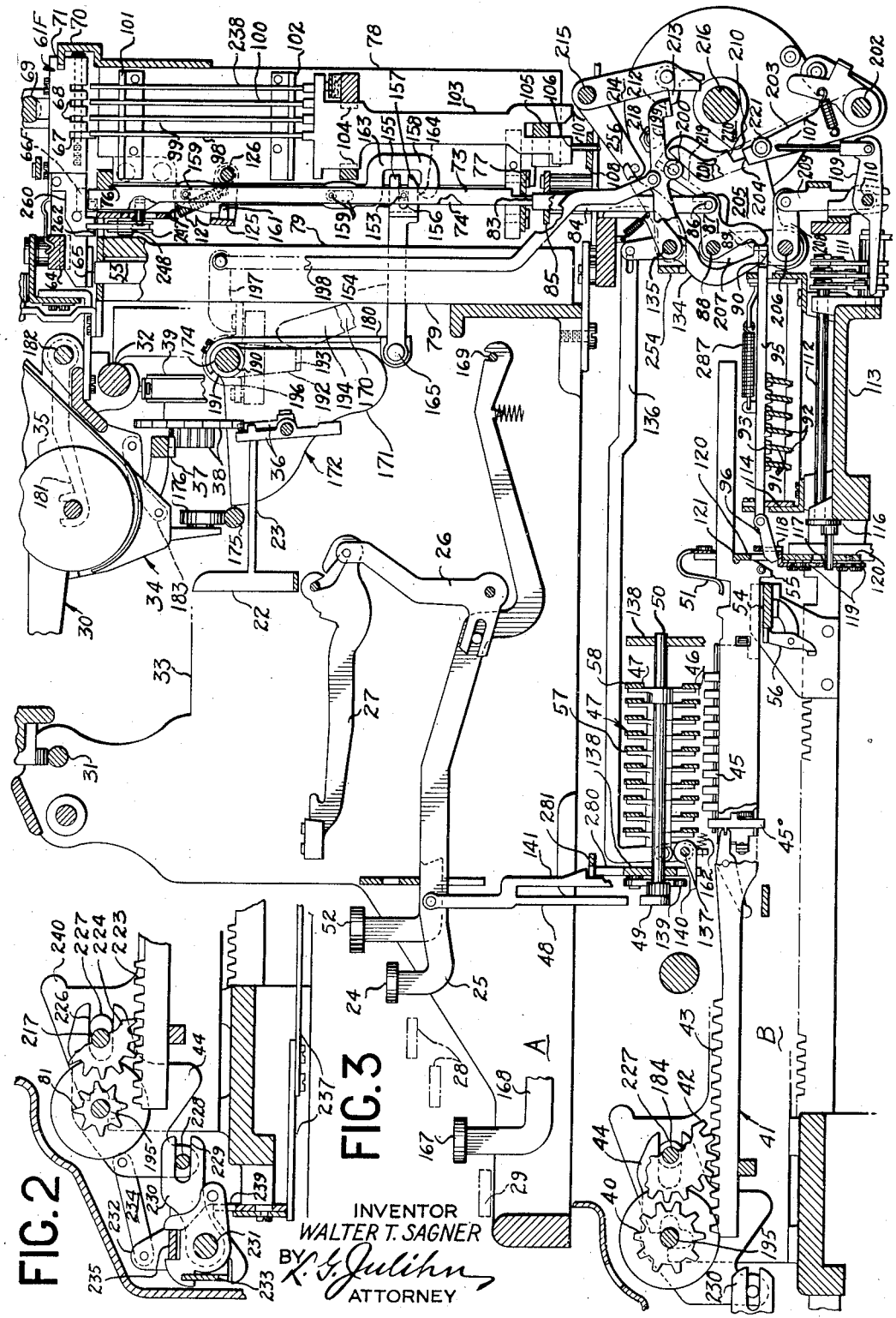

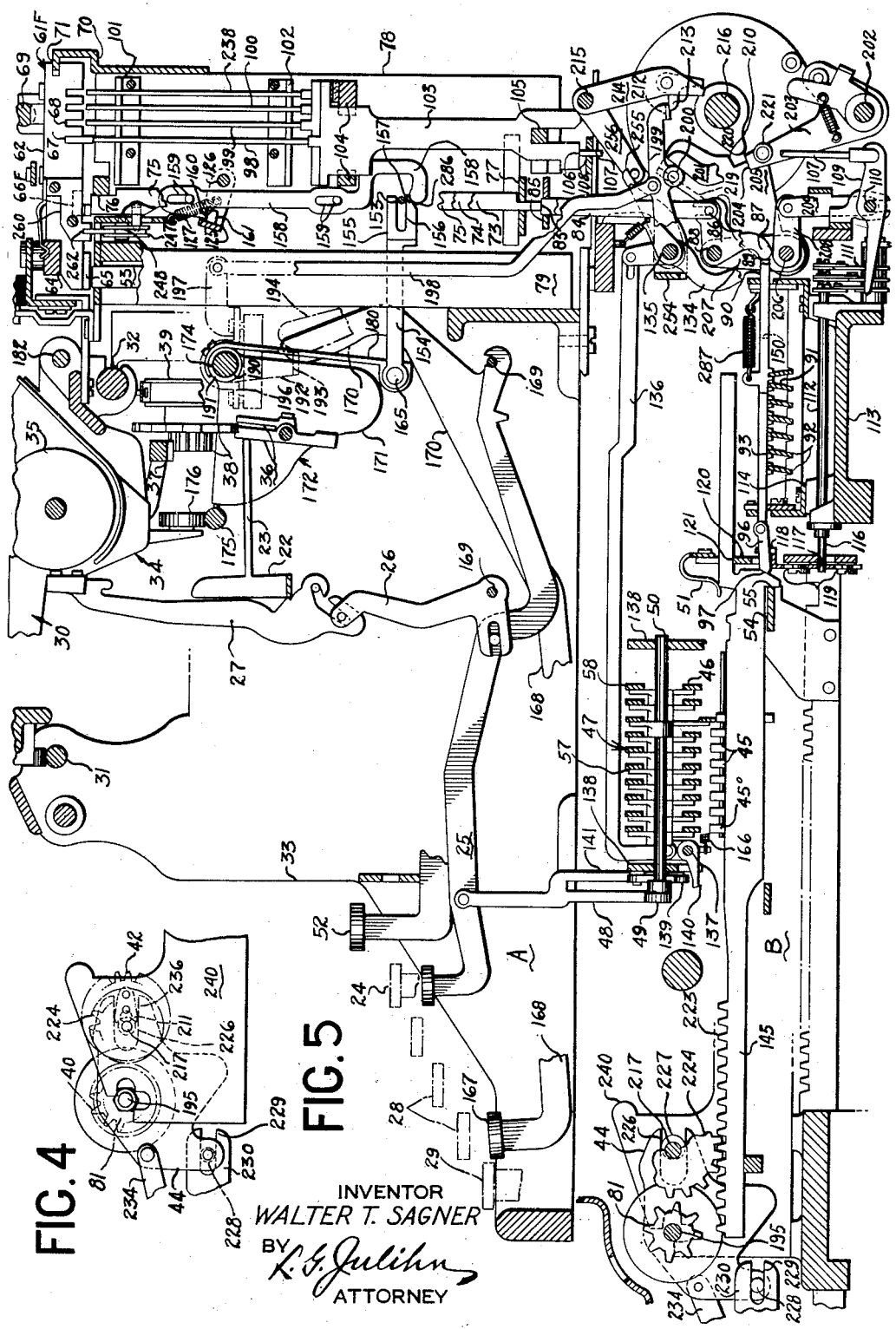

Jan. 9, 1940.  W. T. SAGNER  2,186,347
COMBINED TYPEWRITING AND COMPUTING MACHINE
Filed Jan. 19, 1938  7 Sheets-Sheet 4
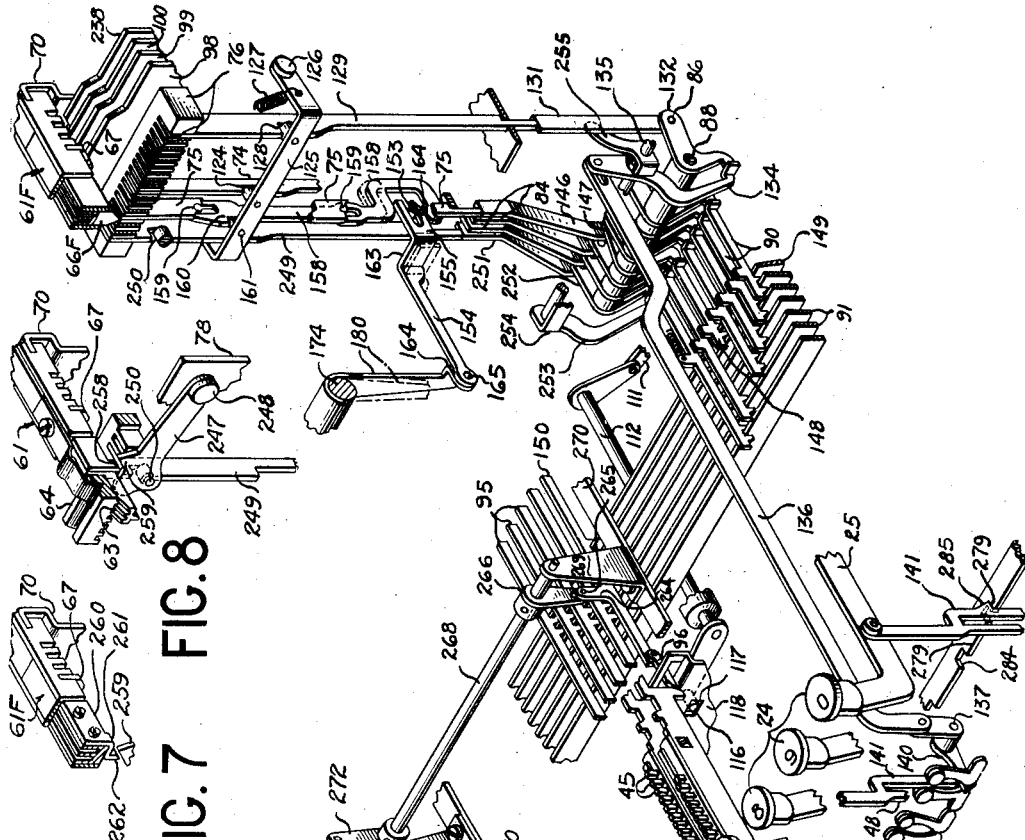
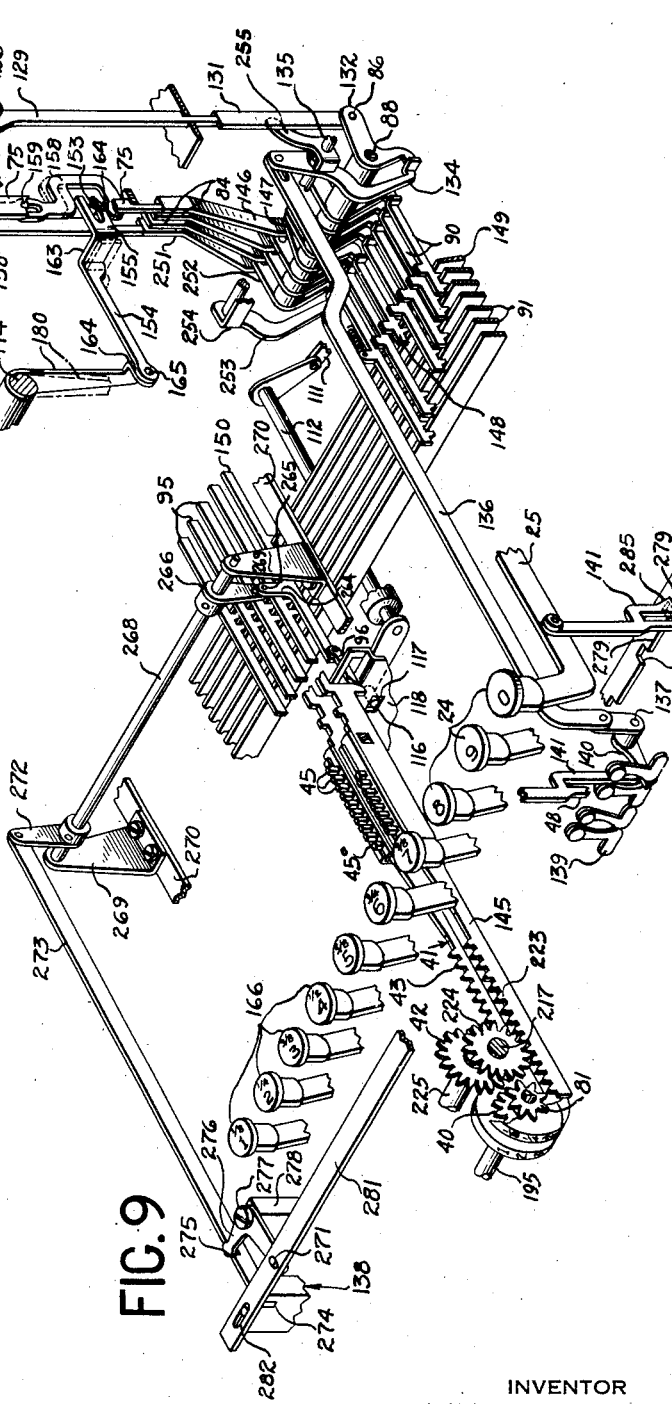
INVENTOR
WALTER T. SAGNER
BY
*L. G. Julihn*
ATTORNEY Jan. 9, 1940.    W. T. SAGNER    2,186,347
COMBINED TYPEWRITING AND COMPUTING MACHINE
Filed Jan. 19, 1938    7 Sheets-Sheet 5

INVENTOR
WALTER T. SAGNER
BY
ATTORNEY

Jan. 9, 1940. W. T. SAGNER 2,186,347
COMBINED TYPEWRITING AND COMPUTING MACHINE
Filed Jan. 19, 1938 7 Sheets-Sheet 6

INVENTOR
WALTER T. SAGNER
BY
ATTORNEY

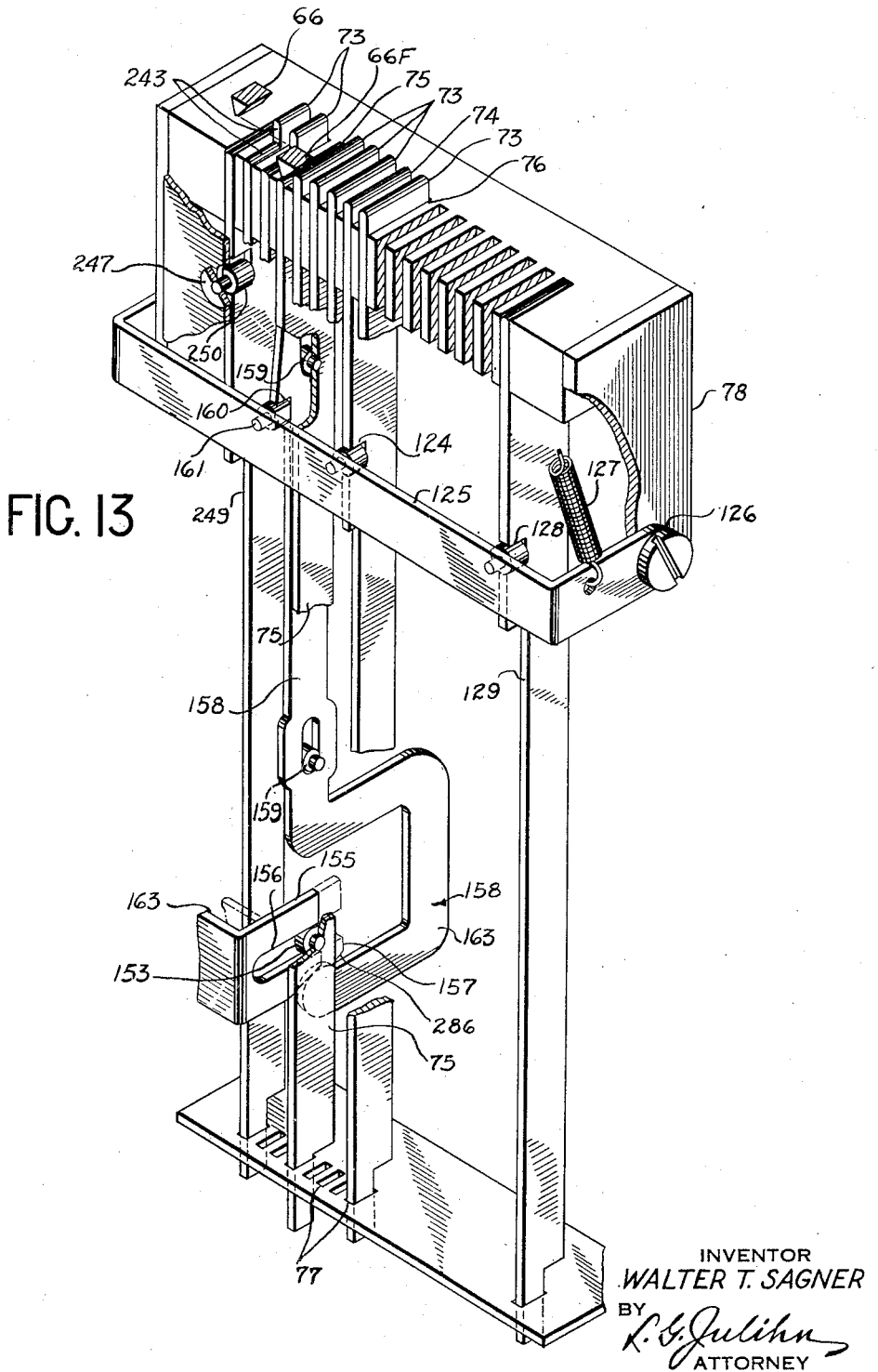

Patented Jan. 9, 1940

2,186,347

UNITED STATES PATENT OFFICE 2,186,347

COMBINED TYPEWRITING AND COMPUTING MACHINE

Walter T. Sagner, Wethersfield, Conn., assignor to Underwood Elliott Fisher Company, New York, N. Y., a corporation of Delaware Application January 19, 1938, Serial No. 185,721

15 Claims. (Cl. 235—60)

This invention relates to combined typewriting and computing machines and is herein explained with reference to a machine of the Underwood-Hanson class in which numeral type-keys and a step by step feeding carriage controlled thereby co-operate to index computing-wheel drivers of successive denominations seriatim preparatory to actuating a general operator to cycle said drivers to enter the indexed amount in the computing wheels.

As exemplified in U. S. Patent No. 2,091,717 to H. L. Pitman, dated August 31, 1937, such machine may have a plurality of registers or sets of computing-wheels, and sets of indexable drivers therefor; and a single denominational series or set of trains actuatable seriatim by the carriage may ramify to the several sets of drivers, and, further, the sets of ramifications of said trains may be connected selectively, under the control of the carriage, to the corresponding sets of drivers for the purpose of effecting register selection at one or more computing-zones in the carriage-travel.

The invention deals with devices associated with typing and computing relative to denominations that include only decimal orders as in a dollars-and-cents amount, or denominations that include an odd order such as a fraction-expressing order in a quantity amount.

The numbers:

9 887 65 and 9 843½ exemplify, respectively, the decimally expressed amount and the odd order or fraction-including amount. In such first number representing, say, dollars and cents, the typed tens-of-cents figure, "6", is usually separated, as shown, from the typed units-of-dollars figure, "7", by a punctuation space which is produced as by operating the typewriter space-key between the typings of said figures. The machine may have provision whereby the typing carriage may be effective, through its position at the punctuation space, to lock the numeral type keys.

Comparing the above numbers as written for illustration, one below the other, it will be perceived that the "½" of the lower or quantity expressing number may be typed when the typing carriage is at, what would correspond to, said punctuation space of the upper or dollars and cents number. The above numbers may also be typed each in a different column of the work sheet, the fraction, however, being typed at what is a punctuation space position of the carriage relative to the aforesaid single set of trains actuatable by the carriage.

It is an object of the invention to provide for disabling or suppressing the numeral key-locking function of the carriage at the punctuation space when it is desired to type at such space a numeral or fraction, such as the above "½", by means of a type key or type action that is ordinarily locked at said space.

In decimal computing, as, for example, with respect to the first of the above numbers, it will be obvious that no computing wheel driver need be indexed at the punctuation-space position of the carriage. But, when typing a fraction such as the above "½", at the punctuation space, and when it is desired to compute the amount including such fraction, the fraction may be indexed in a driver for a fraction-computing wheel, and it is a further object of the invention to provide for this.

A further object of the invention is to provide for disabling or suppressing said key-locking function at will as by means of a key operable preparatory to typing the fraction at the punctuation-space position of the carriage.

The fraction characters may be printed by means of upper-case types that may be associated with lower-case types used for printing the usual digit characters.

The machine may have provision whereby operation of the case-shift mechanism, for typing in upper case, may disable the carriage control of the computing-wheel drivers so that when typing in upper case by means of the numeral type-actions, the latter will not be effective to index said drivers at a computing zone of the carriage. The carriage control of the drivers is effected by means of denomination jacks traversed by the carriage at the computing zone and forming part of the aforesaid trains ramifying to the several sets of computing-wheel drivers. There is also a jack engaged and actuated by the carriage at the aforesaid punctuation space to actuate the key-locking mechanism. All of said jacks, including the key-locking jack, are ordinarily caused to be disabled at operation of a case-shift key for typing in upper case. An object of the invention is to have another key operative to effect the case shift but without causing disablement of said jacks, including the punctuation-space jack. It is a further feature of the invention, therefore, to provide means, rendered effective as a result of operating said other case-shift key, for disassociating the key-locking function from said punctuation space jack and to have the latter, however, operable by the carriage at the punctuation space position to select a computing-wheel driver in which the fraction or odd order is to be indexed.

The denomination-jacks are traversed seriatim by a denomination-selector or tappet movable along with the carriage, and, in order to be engageable by this same tappet, the punctuation-space jack, which herein is used also as the fraction-denomination jack, may be disposed as usual between the appropriate two denomination-jacks.

A certain register may be adapted for accumulating fraction-including amounts, while ordinary decimal amounts may be accumulated in one or more other registers. The typing-carriage range of travel may include one or more computing-zones, and, for each computing zone there is provided a denomination-selector or jack-engaging tappet. One or more register-selectors may also be provided on the carriage for each computing-zone.

It will be perceived in comparing the above decimal amount and the fraction-including amount as typed one below the other, that the carriage, after leaving the last denomination of the fraction-including amount, would still be within the computing-zone for the decimal amount. A feature of the invention pertains to arranging the denomination-jacks and a jack-engaging tappet provided on the carriage for the fractional-amount zone so that said latter tappet is ineffective to actuate any decimal-denomination jacks after leaving the punctuation-space or fractional-character-representing jack.

The carriage, in taking the letter-space step following the typing or indexing of the last digit for an ordinary decimal amount may actuate a cycling jack to cause automatically the general operator to be cycled. A further feature of the invention pertains to causing the general operator to be cycled automatically also at the instance of typing and indexing the fraction which is the last denomination-character of a fraction-expressing amount.

The normal all-keys-locking function is effective as the carriage reaches the fraction denomination in the typing and indexing of a quantity-fraction amount. Thus, there is blocked any attempt by the typist to write a fraction without first determining, as through operation of the case shift, that a fraction character and not a digit character will be typed.

The machine usually has ten digit type keys, from "0" to "9". Considering, for example, the fractions as expressed in eighths, the digit key levers, say, from "1" to "7" may be used for typing the fractions ⅛, ¼ . . . ⅞ in upper case. Thus, the remaining three digit type keys for "8", "9" and "0" are not used in fraction typing and indexing. Certain features of the invention pertain to novel provision for having only said "1" to "7" type keys unlocked preparatory to typing the fraction, and consonantly having said remaining keys locked to prevent inadvertent use thereof.

Other features and advantages will hereinafter appear.

In the drawings:

Figure 2 is a sectional side view showing the quantity-fraction register.

Figure 3 is a sectional side view showing the typewriter and computing base and mechanism related to the invention.

Figure 4 is a side elevation showing details of the quantity-fraction register.

Figure 5 is a sectional side view of the machine showing the parts operated for typing and indexing a fraction.

Figure 6 is a diagram of a work sheet having decimal computing columns and a quantity-fraction column.

Figure 7 is a perspective of the selector unit, placeable on the carriage, relative to a fraction computing zone, parts of said unit being shown broken away to illustrate a cycle tripping tooth for said unit.

Figure 8 is a perspective of the selector unit for a decimal computing zone and shows said unit in relation to a cycle tripping train.

Figure 9 is a perspective diagram showing the quantity fraction-computing zone unit, on the carriage, operating the train to shift the fraction-computing register bar to indexable position and shows the concomitant operation of mechanism for locking all the numeral keys. This view also shows other mechanism for locking all but the fraction typing keys.

Figure 13 is a perspective of the jack mechanism drawn on an enlarged scale to bring out details of parts of the key-lock releasing mechanism associated with said jack mechanism.

Figure 1:
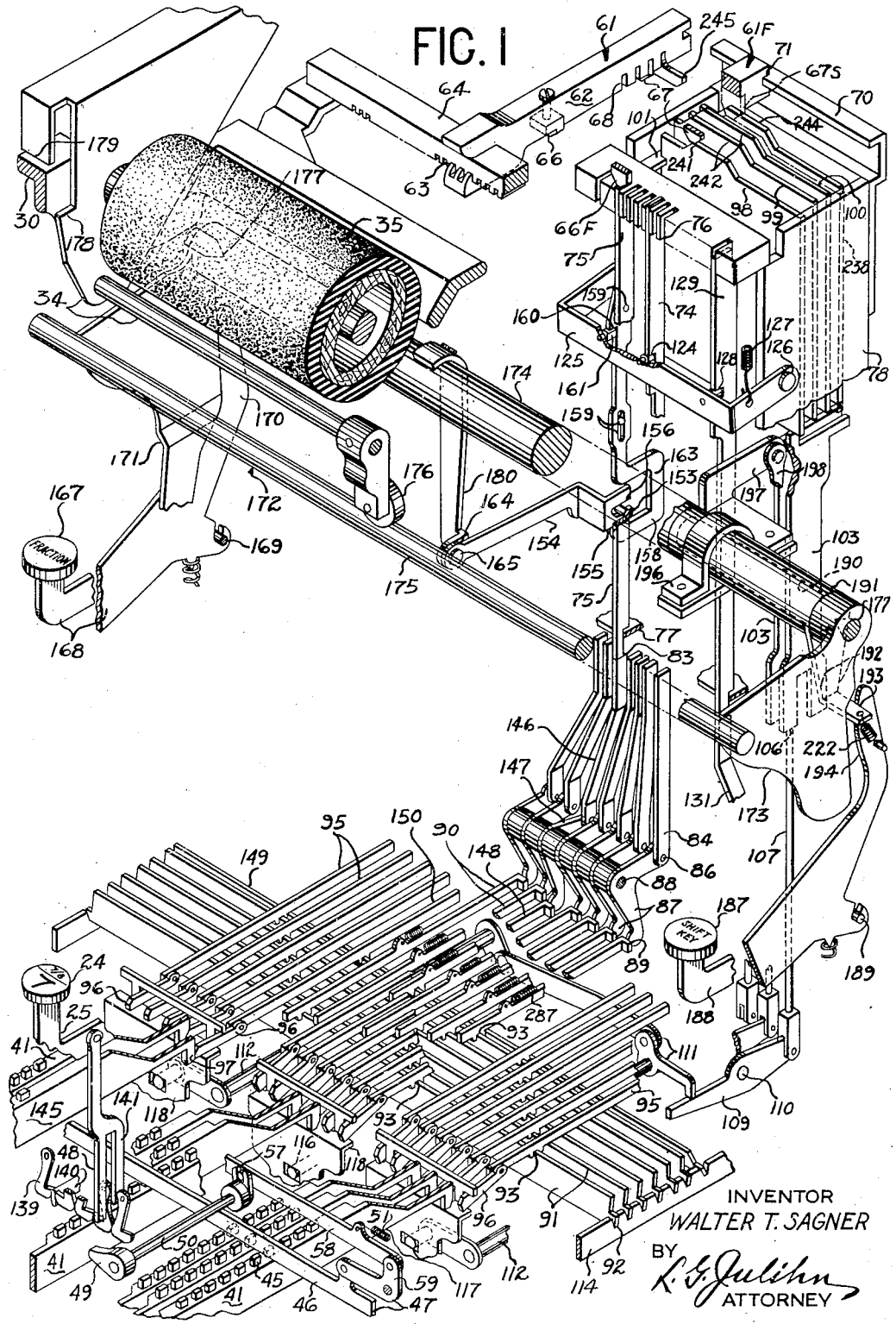
Figure 1 is a perspective showing principally the carriage, case shift mechanism, and features of a plural-register mechanism arranged for typing and indexing all-decimal amounts and fraction-including amounts, some of the parts being shown broken away and sectioned for clarity.

In a machine of the Underwood-Hanson class, a typewriter mechanism A surmounts a computing-base B, Figure 3.

24, 25, 26 and 27 indicate, respectively, the keys, key-levers, bell-cranks and type-bars of the numeral or digit type-actions of the typing system. The alphabet type-actions are represented by the alphabet keys 28, and the space-key action is represented by the space-key 29. The usual paper carriage 30 runs upon rails 31, 32 in the typewriter frame 33 and supports a case-shiftable frame 34 in which a platen 35 is journaled. At operation of any type-action or of the space-key action, escapement dogs 36, feed-rack 37, escapement-wheel 38 and carriage spring motor 39 cooperate to letter-feed the carriage 30. A universal bar 22 has the usual connection represented diagrammatically at 23, Figure 3, to work said dogs 36 and is actuatable by any type bar 27.

The computing-base B may have one or more registers which may be of the kind shown in Patent 1,927,951 to H. L. Pitman, dated September 26, 1933, in that for driving the register computing wheels 40 oppositely for addition and direct subtraction there is provided for each register or set of said wheels 40, a set of register bars 41, and idlers 42, permanently in mesh with racks 43 on said register-bars. Each set of computing wheels 40 normally stands disengaged from its idlers 42 and racks 43, as in Figures 2 and 3. Each set of computing wheels 40 is mounted in a frame 44 shiftable rearwardly to mesh said wheels 40 with said idlers 42 or downwardly to mesh said wheels with said racks 43.

The register bars 41 of a set are slightly advanceable seriatim to align each of their series of digit pins 45, 45° with pin-setting bars 46 which extend across all the register bars and form part of the usual Underwood-Hanson pin-setting linkages 47 representing different digits. Each numeral key-lever 25 has a pendent rod 48 to engage an arm 49 of a rock-shaft 50 to rock the latter and thereby actuate the corresponding linkage 47 to set downwardly, in whichever register-bar is slightly advanced, the digit-pin 45 corresponding to said numeral key-lever 25. Each linkage 47 has its individual rock-shaft 50 connected at 57 to an upper and endwise movable cross-link 58 of the linkage 47, said upper link 58 and the pin-setting bar 46 being connected by bell-cranks 59. The usual spring device 51 returns each register bar following its slight advance and the setting of a digit pin therein.

A denominational tabulating mechanism for the carriage is diagrammatically represented by denominational tabulating-keys 52 and denominational tabulating-stops 53, Figure 3. Said denominational keys 52, stops 53 and the co-operating connections and carriage-release means (not shown) may be of the kind shown in Patent 1,858,447, to W. F. Helmond, dated May 17, 1932.

The usual reciprocatory general operator cross-bar 54, of a cycling-mechanism is common to all of the register-bars 41, and, by means of fingers 56, Fig. 3, pivoted thereon, may engage the set digit-pins 45 to advance the register-bars to rotate the wheels 40 at the advance stroke of said cross-bar 54, said wheels 40 having been shifted first, as will be explained later, to engage either the racks 43 or the idlers 42. At the return stroke of the cycling cross-bar 54, the latter engages shoulders 55 of the advanced register-bars 41 to return the latter, the computing wheels 40 having been disengaged first from the racks 43 or idlers 42. The spring devices 51 become effective to retract the returned register-bars sufficiently from the returned cross-bar 54 to permit the aforesaid slight advance of the register-bars for the pin-setting operation.

Amounts typed in different columns across a work-sheet as represented in Figure 6 may be accumulated in selected registers.

For each computing zone corresponding to a work-sheet column, the carriage has a selector unit 61 (or 61F) having a body 62 locatable as at 63 along a carriage supported rack 64, Figure 1. Said body 62 may have a column stop 65 for engaging any one of the denominational key-operated tabulating stops 53. The body 62 includes a tappet 66 (or 66F) and one or more register-selecting teeth 67 differentially placeable in body slots 68. The body 62 may be laterally supported at its top and rear, Figure 3, by a rear rack 69 on the carriage and its rear end may engage a horizontal guide rail 70, as at 71, Figure 3. Said guide rail 70 is adapted to brace said unit 61 (or 61F) vertically while the latter passes through a computing zone.

The tappet 66 (or 66F) traverses a single series of jacks 73, 74, 75, Figures 1, 3, 13, shown in the form of vertical flat rods depressible seriatim by said tappet and therefore slidably retained at their upper ends as at 76, and at their lower ends as at 77, in a housing 78 attached to the typewriter frame 33 to which is also attached a housing 79 adapted to guide vertically the tabulating stops 53.

Figure 10:
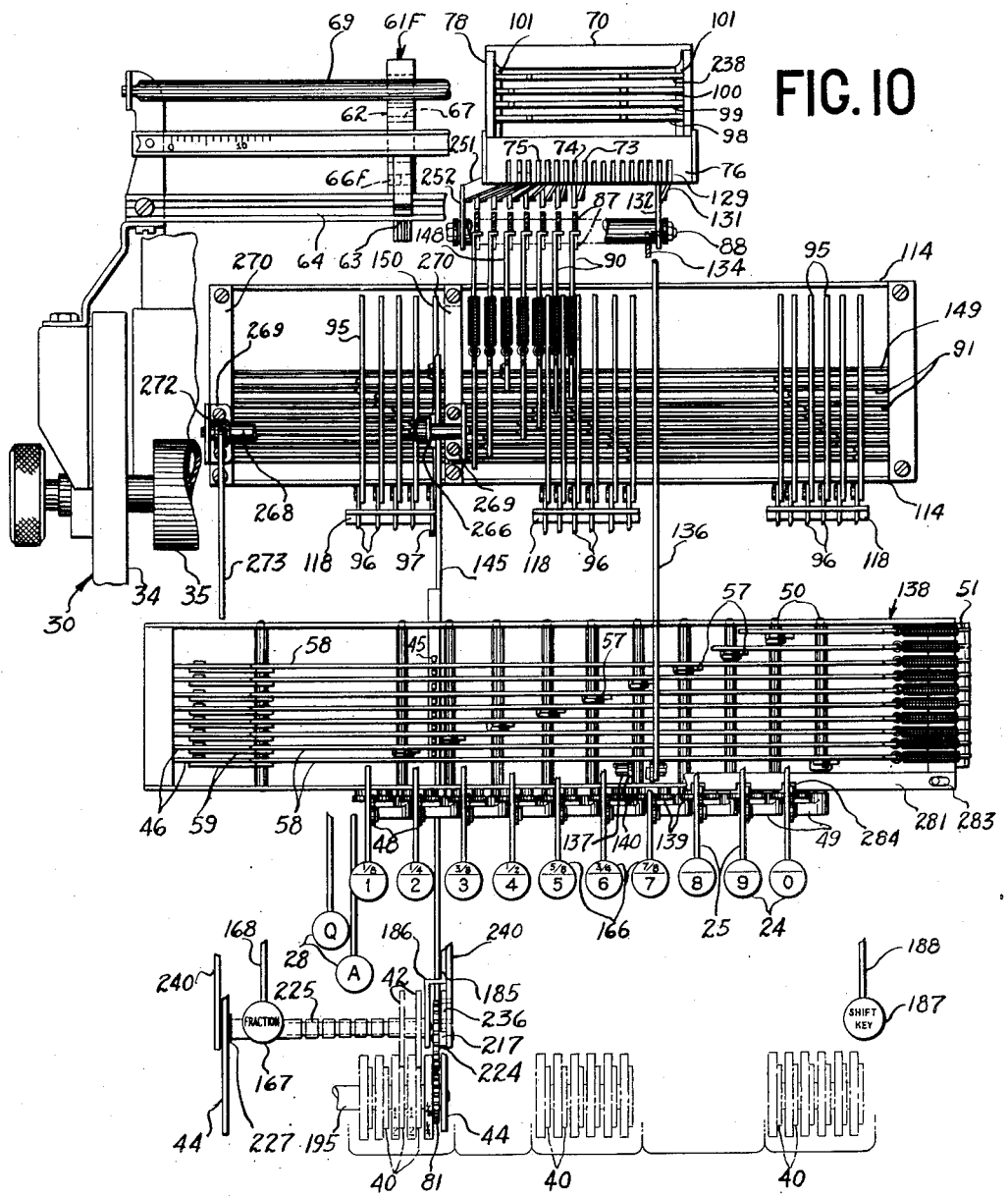
Figure 10 is a plan view diagram showing a part of the typewriter carriage, and indexing mechanism in the computing base for indexing a fraction, the view representing a plurality of registers including all-decimal registers and a quantity-fraction register.

The machine is shown provided with three registers and therefore with three sets of register-bars, as indicated in Figures 1 and 10. The second and third registers from the left may be all-decimal registers, each having, say, six computing wheels 40 and six register-bars 41, and their idlers 42 for accumulating up to 9 999 99. The other register, seen at the left, is adapted for accumulating fractions in a right-hand or last-denomination wheel 81 and has, besides said wheel 81, say, four decimal order wheels 40, for accumulating up to 9 999⅞, the fractions being illustratively expressed in eighths.

The largest number of register-bars in any decimal register thus being six, there are six of the jacks 73 hereinafter called denomination jacks. Interspaced with said denomination jacks 73, according to punctuation spaces which, it will be perceived, may point off the typed number such as 9 999 99, there are shown two punctuation space jacks 74 and 75.

The denomination jacks 73 form parts of trains extending down into the computing-base B and therein ramifying to the different sets of register-bars 41. The ramifying arrangement may be substantially as in Patent No. 2,090,852 to H. L. Pitman, dated August 24, 1937.

Said arrangement, briefly described, is as follows, Figures 1, 3, 5, 9, 10: The lower end of each denomination jack 73 abuts, as at 83, a vertical thrust-rod 84 slidable at its upper end-portion in a guide 85 in the computing base B, and pivotally connected at 86 to a companion bell-crank 87. The several bell-cranks 87 have a common fulcrum-rod 88 in the computing base and have downwardly extending arms abutting, as at 89, the rear ends of forwardly extending horizontal master racks 90. Transverse blades 91 are mounted, as at 92, to rock about their lower edges, the upper edge of each transverse blade being adapted to mesh, as at 93, Figure 1, with the companion master rack 90. Each blade 91, it will be perceived, is of the same denomination as the jack 73 to which it is connected by means of the master rack 90, the bell-crank 87 and the thrust-rod 84. The transverse blades 91 mesh with sets, one set for each register, of distributive or shift racks 95. The distributive racks 95 for the middle register are shown, Figure 1, partly interspaced with the master racks 90. Each distributive rack 95 has pivoted to its forward end a coupler 96, the set of couplers for each set of distributive racks being normally in depressed position as in Figure 3, and the sets of distributive racks which form the sets of ramifications of the denomination trains being thus normally disconnected from their companion sets of register-bars 41. For selecting a register, the set of couplers 96 associated therewith is swingable upwardly, under control of the carriage, to bring the forward ends of the couplers into abutment with the register-bars 41 as indicated at 97, Figures 1 and 5.

Carriage-controlled register-selecting trains may herein be of the type disclosed in the application of H. L. Pitman, Serial No. 72,348, filed April 2, 1936. Briefly described, such register-selecting trains are as follows: For the three registers shown, three vertically slidable camplates 98, 99, 100 work in guides 101, 102 in the housing 78. Figure 3 shows completely the train for one of the registers, from which it will be perceived that the lower end of each cam-plate 98—100 abuts a companion plate 103, the several plates 103 being individually slidable vertically in guides 104, 105 in the housing 78. Each plate 103 abuts, as at 106, an upright thrust-rod 107 slidable at its upper end in a guide 108 in the computing base, the lower end of each thrust-rod 107 being pivotally connected to a lever 109. The several levers 109 may be on a fulcrum-rod 110 in the computing base and each lever may be connected by a linkage 111 to a coupler-set controlling rock-shaft 112 journaled in a cross-member 113 of the computing-base framework. It may be noted that said cross-bar 113 also supports a frame 114 in which the master racks 90, blades 91, and distributive racks 95 are mounted. Each rock-shaft 112 has a crank wrist 116 for engaging, as at 117, a plate 118 adapted to move a companion set of the couplers 96 upwardly from the normal, idle position, Figure 3, to the effective Figure 5 position, said plate 118 being slidably retained, as at 119, for vertical movement on a stationary plate 120, of the computing-base framework, adapted also to support slidably the rear end of the register-bars 41, as at 121, Figure 3.

For selectively engaging one or more of the register-selecting cam-plates 98—100, each selector unit on the typing carriage may have one or more of the register-selecting teeth 67. Figure 5 shows a selector unit 61F having a tooth 67 selecting and depressing the fraction-register cam-plate 98, wherefore the rest of that register-selecting train extending, as just described, to the coupler-set controlling plate 118 is shown operated to raise the set of couplers 96 for the fractional register into operative position to abut the set of register bars for the fractional register as at 97, Figure 1. It will be obvious that the trains from the other register-selecting cam-plates 99, 100 may be substantially similar to the one just described, it being understood that each rock shaft 112 and its wrist 116 may be suitably disposed relative to its coupler controlling plate 118 and that the linkage 111 may be adapted to connect the rock-shafts 112 to the companion levers 109 which may be grouped as in Figures 1 and 3.

It will be remembered that the jacks 74 and 75 are punctuation-space jacks interspaced with the denomination jacks 73. The first denomination jack 73 from the right of Figure 13 is for a units of thousands denomination relative to a number such as 9 999 99 and has in order of succession thereto the punctuation jack 74. Said jack 74 does not operate to select a register-bar, its function being solely to co-operate to lock the digit type-actions through being depressed by the carriage tappet 66 when the carriage is at the first punctuation-space position from the left, as noted in said typed number 9 999 99. For this purpose said jack has a pin-and-slot connection 124, Figure 13, to a universal bail 125 pivoted as at 126 to the housing 78. A spring 127 yieldably upholds said bail 125 and the thereto connected jack 74 in normal position in which a shoulder on the jack 74 abuts the underside of the guide 76 as in Figure 3. The universal bail 125 is connected by a pin-and-slot connection 128 to a jack 129 which is a dummy in that it is shortened so that its upper end is not engageable by any of the tappets such as 66. At its lower end, Figure 9, said dummy jack 129 abuts a thrust-rod 131 guided like the thrust-rods 84 and connected to a bell-crank 132 mounted on the fulcrum-rod 88. Said bell-crank 132 abuts the lower arm of a lever 134 keyed to a rock-shaft 135 in the computing-base. Said lever 134 is connected by a link 136 to a rock-shaft 137 journaled in a frame 138 for the pin-setting linkages 47. Pendently pivoted individually to the front of said frame 138 there are tumblers 139 arranged in a row confined at its ends so that the row may be closed up by an interponent 140 on said rock-shaft 137 when the latter is rocked clockwise of Figure 3 by means of the punctuation-jack train just described. When the row or series of tumblers 139 is thus closed up there is no room for admission therebetween of any of the rods 141 seen depending from the numeral key-levers 25, and, thus, depression of said key-levers is prevented to prevent typing at a punctuation space. The interponent 140 is yieldably connected to the rock-shaft 137 so that the latter may be rotated independently by means of a carriage-depressed punctuation-jack, it being noted that said key-locking tumblers 139 are also adapted to prevent simultaneous depression of two numeral key-levers 25, or simultaneous depression of one of said key-levers 25 and interposing of the interponent 140. The arrangement of the tumblers 139, the interponent 140 and pendent rods 141 may be, as to further details, substantially as disclosed in Patent 1,237,895 to W. L. Gumprecht, dated August 21, 1917.

The punctuation-space jack 75, considering the dollars-and-cents amount, 9 999 99, is between the two jacks 73 for tens of cents and units of dollars, and if the machine were adapted to compute solely in decimal orders, said jack 75 would be connected directly to the universal bail 125, like the jack 74, for operating the dummy jack 129 to lock the keys.

However, it is desired to type and compute a fraction such as "⅜" in the illustrative quantity-fraction number 9 367⅜, when the carriage has depressed said jack 75; the fraction being typed and computed when the carriage is at, what is ordinarily, the punctuation space corresponding with said jack 75. Novel mechanism is therefore provided whereby depression of said jack 75 operates, as through the dummy jack 129 to lock the digit type-keys at said punctuation space when a decimal register is used at a computing zone but whereby said jack 75 is made ineffective for so locking the type-keys when a register for said quantity-fraction number is used at the computing zone. In such arrangement the jack 75, when depressed, also selects a fraction-order computing-wheel driver or register-bar 145 associated with the fractions wheel 81 of the quantity-fraction register.

For selecting, that is, slightly advancing, said fraction register-bar 145, the jack 75 operates, Figures 1, 9, 10, 12, through a thrust-rod 146, a bell-crank 147 fulcrumed on the rod 88, a master rack 148, a blade 149 and a distributive rack 150 having a coupler 96. Said latter coupler, 96, is controlled by the plate 118 along with the other couplers 96 associated with the distributive racks 95 that control the other register-bars, 41, for the quantity-fraction register, it being noted that the set of register bars for the fraction register includes said fraction register-bar 145. The train from the jack 75 to and including the blade 149 is individual to the fraction register since said blade has only the distributive rack 150 for the fraction register-bar 145 connected thereto, the reason for this being that a decimal register has no fraction-computing order or denomination.

The fraction register ordinarily is not used at a computing zone together with a decimal register. Thus, while using the decimal-register mechanism, the couplers 96 for the fraction register will be in their normal depressed or idle positions and the jack 75 when depressed by the carriage at the corresponding punctuation space relative to ordinary decimal computing will cause an idle advance of the distributive rack 150.

For releasably locking the digit type keys by means of the jack 75 and the dummy jack 129, the arrangement is as follows. The jack 75 has projecting laterally therefrom a stud 153. A connector-bar 154 has a forked rear end 155 formed by a slot 156 to slidably fit over said stud 153 as indicated in Figure 13. Thus, the lower branch 157 of said forked rear end serves as a retractible connection between said stud 153 and a secondary jack 158 that, for vertical movement, may be slidably mounted on the jack 75 as by means of two vertically spaced pin-and-slot connections 159. Said secondary jack 158 has a shoulder 160 engaging a pin 161 of the universal bail 125. Said secondary jack 158 may be disposed in the space between the jack 75 and the next jack 73 and the forked rear end 155 of the connector-bar 154 may also be disposed in the space between said jacks 75, 73, the lower end portion of said secondary jack 158 therefore having a crook 163 to pass behind said connector-bar rear end 155 and then forwardly under the latter for engaging therewith edgewise as at 164, Figures 3 and 9. The front end of the connector-bar is pivoted at 165.

It will be perceived now that when the jack 75 is depressed its stud 153 may depress the rear end 155 of the connector-bar 154 to depress the secondary jack 158 to rock the universal bail 125 to depress the dummy jack 129. The depressed dummy jack 129 locks the digit type key levers 25 in the manner hereinbefore described.

When the carriage is at the punctuation space corresponding with the jack 75 and the fraction register is being used, the connector-bar 154 is movable forwardly on the jack stud 153 to release, while the jack 75 remains depressed, the depressed secondary jack 158 along with the depressed bail 125, the depressed dummy jack 129 and the key-locking interponent 140, connected to said jack 129 as described, the spring 127, for the bail 125, and another spring 162, Figure 3, for the rock-shaft 137 co-operating to restore the thus released parts and thereby causing the digit key levers 25 to become unlocked. This permits, Figure 5, typing of the fractions while the jack 75 remains depressed in order to slightly advance the fraction register-bar 145 to fraction pin-setting position under the pin-setting bars 46.

Figure 11:
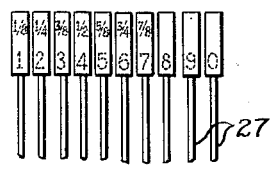
Figure 11 is a diagram illustrating the type bars that carry the digit types and the fraction types.
Figure 12:
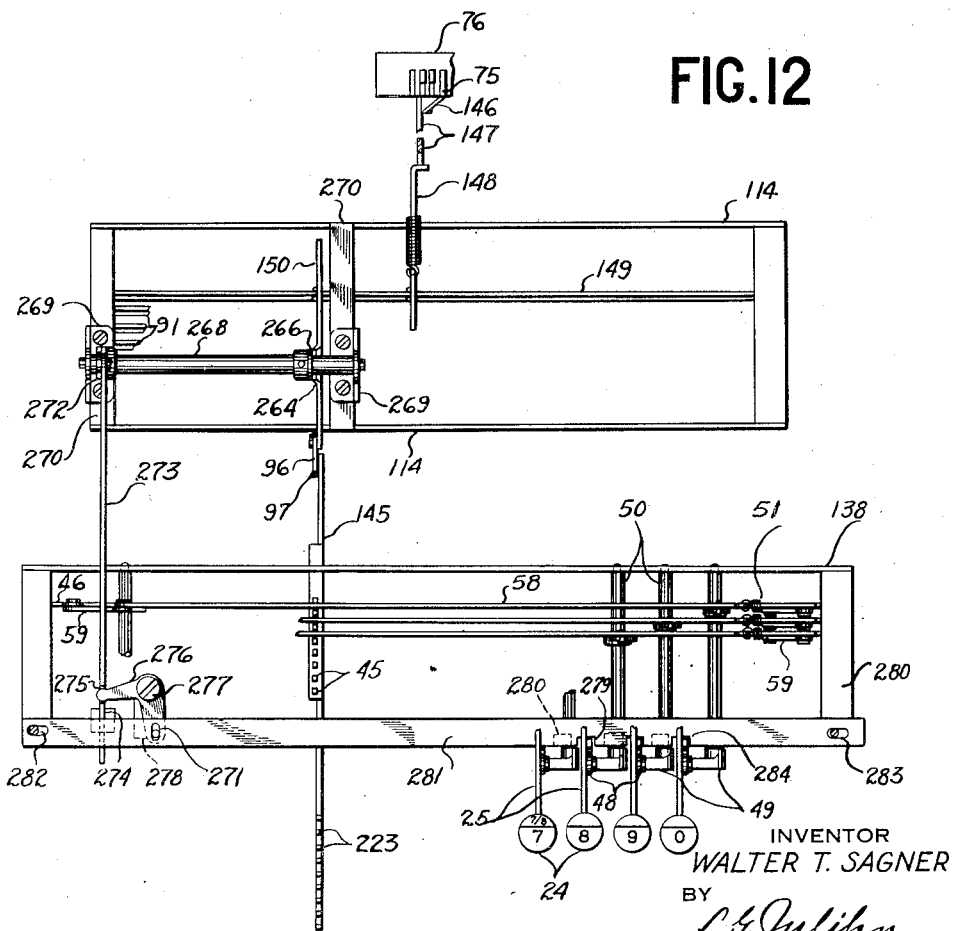
Figure 12 is a plan view of the mechanism for locking all but the fraction printing keys of the row of digit keys.

The fractions are typed by upper case types. Thus, considering the fractions as being expressed in eights, the type bar 25 that has the lower case type "1" also has an upper case type for typing "⅛" and the type bar having the lower case type "2" has the upper case type "¼", and so on up to the type bar for the lower case type "7" which has an upper case type "⅞". It will be perceived now that the digit keys for "1" to "7" are also used for typing the fractions ⅛, ¼ ... ⅞ as indicated in Figure 11 and by the key characters 166, Figure 10.

Preparatory to typing a fraction, the platen 35 is shifted to upper case position by means of the left-hand shift key 167, and its key lever 168 fulcrumed at 169 and having an arm 170 engaging a left side member 171 of a shift rail frame 172. Said side-member 171 and a right side member 173 are rigidly connected by a rear cross shaft 174 and a front shift rail 175 along which runs, during travel of the carriage 30, a roller 176 on the case-shiftable platen-frame 34. The shift rail frame 172 is pivoted as usual to the typewriter frame 33 as at 177, Figure 1, so as to be rockable, by depression of said case shift key lever 168, for raising its shift rail 175 to shift the platen frame 34 and its platen 35 to upper case position determined by a case shift stop (not shown) on the carriage 30 engaged by shoulders 178 at the sides of the shift frame. In the lower case position of the platen 35, its shift frame 34 stops against the carriage 30 as at 179, Figure 1.

The shift rail frame cross shaft 174 has fixed thereto a depending arm 180 to which is pivoted, as above mentioned at 165, the connector-bar 154 which normally operatively connects the jack 75 and the secondary jack 158. Thus, when said shift rail frame 172 is rocked by depressing the left shift key 167 preparatory to typing a fraction when the carriage is at the position at which it has depressed the jack 75, and has also depressed, through the medium of the connector-bar 154, the secondary jack 158, the connector-bar 154 is withdrawn. This releases the secondary jack 158 for its resulting return to normal position and thereby causes the digit-type-key levers 25 to become unlocked; the jack 75, however, remaining depressed to select the fraction register bar 145 for indexing one of its pins 45 by means of one of the thus unlocked digit-type-key levers 25. The usual side arms 181 fixed on a rock shaft 182, Figure 3, journaled in the carriage 30, and lower side links 183, support and guide the platen frame 34 in its case shift movements.

All of the type bars 27 of the type system may have upper and lower case types. In order to type, without computing, in a computing zone, as by means of the digit type keys 25 and the corresponding upper case types, the carriage control of the jacks such as 73–75 and the cam-plates such as 98 may be silenced. For such non-computing upper case typing, a right hand shift key 187 and its key lever 188, fulcrumed at 189, Figure 1, are depressed to rock the shift-rail frame 172 to raise the shiftable frame 34 and platen 35 to upper case position. In order that depression of said right hand shift key lever 187, only, avails to disable the carriage relatively to said jacks and cam-plates, the construction may be as follows, Figures 1, 3, 5: The cross shaft 174 of the shift rail frame 172 is reduced as at 190 to receive a rotatably loose sleeve 191 to which is fixed an arm 192 having a lateral extension 193, for engaging the right side member 173 of the shift rail frame 172, and engaged by an arm 194 of the right shift key lever 188.

Rigidly connected to said sleeve 191 by a clamp 196 is a rearwardly extending arm 197 from which depends a link 198 to jack and cam-plate disabling mechanism, in the computing base, which may be substantially of the kind described in said Pitman application No. 72,348.

In said disabling mechanism an arm 199, Figures 3 and 5, connected to the lower end of said link 198, is loosely fulcrumed on the rock shaft 135 and is depressed by said link 198 at depression of the right hand shift key lever 188 whereby a roller 200 on said arm 199 displaces a cam arm 201 fixed to a shaft 202 journaled in the computing base. Said shaft 202 is thus rocked clockwise of Figure 2 to withdraw a latch arm 203 fixed thereto from a step 204 of a latch plate 205 fixed to a rock shaft 206 journaled in the computing base. Said latter rock shaft, 206, has fastened thereto two arms 207 supporting the fulcrum rod 88 for the several bell-cranks 87, 132, 147, and has also fastened thereto two arms 208 from which depends a frame 209 carrying the fulcrum rod 110 for the levers 109 of the register selecting trains. The released latch plate 205 and its rock shaft 206 turn clockwise of Figure 3 until a second latch-plate step 210 strikes said latch arm 203. Thus, the fulcrum shaft 88 is caused to be displaced rearwardly and the fulcrum shaft 110 to be displaced downwardly thereby permitting the jacks 73, 74, 75 etc. and the cam plates 98, 99, 100 to drop or be depressed idly without actuating the master racks 90 of the register bar selecting trains, and without actuating the plates 118, controlling the sets of couplers 96, of the register selecting trains. It will be perceived then that depression of the right shift key lever 188 operates through its arm 194 to turn the sleeve 191 by means of the lateral extension 193 to disable the carriage control of the jack and cam plate trains and by means of said lateral extension 193 to rock also the shift rail frame 172 to upper case position.

The right hand shift key lever 188 is kept down, of course, during the non-computing typing of the upper case charatcer or characters. Upon releasing said right hand shift key lever 188, the shift rail frame 172 is restored to normal lower case position along with the frame 34 and its platen 35 and, concomitantly, the sleeve 191 is rocked back to its normal position thereby lifting the link 198 and the arm 199 connected thereto.

At the lift of said arm 199, a laterally extending tab 212 thereon engages a pawl 213 pivoted to an arm 214 fastened to a trip shaft 215, journaled in the computing base, thereby rocking said shaft 215 counter-clockwise of Figure 3 to actuate a single cycle clutch mechanism (not shown), as described in said application No. 72,348 to connect a general operator shaft 216, journaled in the computing base, with a motor (not shown) for a resulting single revolution clockwise of Figure 3. During said revolution of said shaft 216, a cam roll 218 mounted thereon engages a flange 219 of the latch plate 205 to rock the latter and its shaft 206 counter-clockwise to the normal Figure 3 position, the latch arm 203 being concomitantly spring pressed to reengage under the step 204 of said latch plate 205. This restores the fulcrum rods 88 and 110 to their normal positions, Figure 3, to render the jack and cam plate trains controllable by the carriage again. A cam 220 on the general operator shaft 216 may engage a roller 221 on the latch arm 203 during the cycle to insure return of said latch arm 203 to normal position under said latch plate step 204.

The reciprocatory register-bar-actuating cross bar 54 has a crank and pitman connection (not shown herein, but described in said application No. 72,348) to said general operator shaft 216 so as to be cycled by the latter. In said general operator shaft revolution, for restoring the disabled jacks and cam plate trains following typing in upper case, said register actuating cross bar 54 will be reciprocated idly, that is, without actuating any of the register bars since no pins were set therein due to the disablement of said jack and cam plate trains.

It will be perceived now that at operation of the left hand shift key-lever 168 preparatory to typing and computing a fraction, the jack and cam plate trains are not disabled since the shift frame 172 may be rocked, by said left shift key-lever 168, independently of the sleeve 191 and its connections to the jack and cam-plate disabling mechanism. A spring 222 connected between the lateral extension 193 and the right shift key-lever arm 194, Figure 1, keeps said sleeve 191, and hence the arm 199 that controls the disablement of the jacks and cam-plates, in normal position when the shift rail frame 172 is operated by means of the left shift key-lever 168 for typing and indexing fractions. When said arm 199 is depressed at depression of the right shift key-lever 188 the pawl 213 yields, counter-clockwire of Figure 3, in order to avoid actuating the clutch trip shaft 215, the latter being thus actuated only by the upstroke of said arm 199 as said right shift key-lever is released.

The computing wheels of each register are mounted coaxially on a suitable shaft 195 in the aforesaid frame 44. In the fraction register, namely the first register from the left, Figure 10, the last denomination or fraction computing wheel 81 is of smaller diameter than the other wheels 40. The fraction register is shown illustratively with five computing wheels, including said last wheel 81, for computing amounts up to 9 999 ⅞. The ratio of the diameter of the fraction wheel 81 to the diameter of a decimal wheel 40 is such that the fraction wheel 81 has eight steps of movement (for eighths) between its recurrent zero positions, and the decimal wheel has ten steps of movement between recurrent zero positions. Thus, the fraction wheel 81 may be an eight tooth wheel as in Figure 2 and the decimal wheel 40 may be a ten tooth wheel as in Figure 3. The register bar 145 for the fraction wheel therefore has a rack 223 at a higher level than the decimal register-bar racks 43. Said register bar 145 has eight index pins 45, 45°. Further, there is provided a fraction idler 224 that is of smaller diameter than the decimal idlers 42 and its axis of rotation is offset to the left, Figures 4 and 9, of the axis of said idlers 42. The fraction idler 224 therefore turns on a stud 217 in the side of one of two plates 240 flanking the frame 44 for the fraction register, Figures 4, 5 and 10, while the other idlers 42, in the fraction register, turn on a separate shaft 225 supported by means of the plates 240 flanking the fraction register frame 44. Thus, when the frame 44 for the fraction register is moved rearwardly preparatory to rotating the wheels 40, 81 in subtraction direction, the fraction wheel 81 reaches and meshes with its subtraction idler 224 when the other wheels 40 reach and mesh with their subtraction idlers 42. Frame 44 is slotted as at 226 to move horizontally in guides. For the fraction register said guides are designated at 227, 236, Figures 2, 4, 10. Each frame 44 has a transverse rod 228 slidable in a horizontal slot 229 of an arm 230, Figure 2. Preparatory to additive rotation of a set of the wheels 40, or 40, 81, the frame 44 is rockable downwardly about the guides such as 227, 236 to mesh said wheels with the register bar racks such as 43, 223.

For each register and its frame 44, there are the right and left flanking plates 240, attached to the computing base framework to retain said frame 44 sidewise. A bracket 185 fastened to the left face of the right flanking plate 240 for the fraction register has an offset 186 to the left of the fraction idler 224 to support the right end of the idler shaft 225 as will be apparent in Figure 10, the fraction idler 224 thus being disposed, on its stud 217, between said offset 186 and the right flanking plate 240. The left end of the idler shaft 225 may be directly attached to the left flanking plate 240 and may have a collar forming the guide 227 for the left hand slot 226 of the fraction register frame 44. The left face of the right hand flanking plate 240 for the fraction register presents a plate or boss forming the guide 236 for the right hand slot 226 of the computing wheel frame 44, said boss being adapted as at 211 to clear a hub of the fraction idler 224. Each flanking plate 240 for the decimal register receives an end of an arbor 184 for the decimal register idlers 42 and said arbor may have two of the end collars or guides 227 for the frame 44.

Suitable means for selectively moving any one of the computing wheel frames 44 rearwardly to mesh and unmesh the computing wheels with the idlers, or downwardly to mesh and unmesh the computing wheels with the register bar racks may be as set forth in said Pitman Patent 2,091,717. Briefly described, said means include a rock shaft 231 journaled in the computing base and having rotatably loose thereon, for each computing wheel frame 44, one of the arms 230. For each of said frames 44, there is also rotatably loose on said rock shaft 231 a pair of side arms 232, Figure 2, rigidly connected by a cross bar 233 and having links 234 to the computing wheel frame 44. For each frame 44 there is a coupling bail 235 splined to said rock shaft 231 so as to be slidable laterally to couple said shaft 231 either with the arm 230 for said frame or with the cross bar 233 and its side arms 232. When the arm 230 is thus coupled to said rock shaft 231, the rocking of the latter clockwise of Figure 2 will swing the frame 44 downwardly to mesh the computing pinions with the register-bar racks. When the cross bar 233 and its side arms 232 are coupled to said rock shaft the latter when rocked clockwise shifts the frame 44 rearwardly to mesh the wheels with the idlers.

Said Pitman Patent 2,091,717 also discloses suitable means whereby said rock shaft 231 is rocked clockwise of Figure 2, at the cycling operation, to mesh the computing wheels before the register bar actuating cross bar 54 advances any of the register bars, and is rocked counter-clockwise of Figure 2 to unmesh the computing wheels after the register bars have been advanced to rotate said wheels and before said cross bar 54 engages any of the advanced register bars to return them.

Said Pitman Patent 2,091,717 also discloses suitable state control mechanism that includes, for each register, a state controller 237, partly shown, Figure 2, shiftable from a normally neutral position to a forward additive position determined by depressing the register selecting cam plate 98 or 99 or 100. Said state controller 237 is also shiftable to a farther forward, subtractive position determined by depressing a subtraction cam plate 238, Figures 1, 3, and 5, grouped with the cam plates 98, 99, 100 in the housing 78. Said state controller 237 cooperates with a transverse slide 239, Figure 2, to determine for its register the neutral, additive, and subtractive positions of the coupling bail 235 relative to the rock shaft 231 and the computing wheel frame 44.

The cam plate 98 that controls the set of couplers 96 for the fraction register has a dwell 241, Figure 1, that is shorter than a dwell 242 for the cam plate, 99 or 100, for an all-decimal register. This is because the jack 75, controlling the last denomination or fraction register bar 145, is the last jack operated in the fraction computing zone, whereas in an all-decimal computing zone a register bar controlling jack 73 engaged by the carriage at a second further step to the left of said jack 75 is the last jack operated and, further, because it is desired to have the register selecting tooth 67 release its companion cam plate 98, 99 or 100 when the carriage tappet 66F or 66 releases such last jack 75 or 73.

The selector unit 61 for an all-decimal computing zone has the jack engaging tappet 66 offset rearwardly relatively to a jack engaging tappet 66F provided on the selector unit 61F for a fraction computing zone. Further, the last two denomination jacks 73 corresponding to the last two figures of a number such as 9 999 99 have the forward portions of their upper ends cut away as at 243, Figure 13. Thus, it will be perceived that tappet 66F of the fraction computing zone selector unit 61F cannot engage said last two denomination jacks 73 and is, therefore, out of the fraction computing zone as soon as it leaves the jack 75. It is therefore feasible to minimize the spacing between two succeeding selector units along the carriage so that when a tappet 66F of the unit 61F has just left the jack 75, a tappet 66 or 66F of a succeeding selector unit may immediately depress the highest denomination or first jack 73 from the right of Figure 13. This feature permits the width of the work sheet fraction-including-column to be commensurate with the distance from the jack 75 to the first denomination jack 73 at the right and therefore not excessively wide.

The subtraction cam plate 238 is depressible by a subtraction tooth 67S similar, as to its cam-plate-dwell-engaging portion, to the register selecting tooth 67. Said cam plate 238 therefore has a short dwell 244 like the fraction register selecting cam plate 98 in order to be released concurrently with the tappet 66F of the selector unit 61F leaving the last fraction-computing-zone jack, 75. Said subtraction cam plate 238 is also depressible for determining subtraction in an all-decimal computing zone. Therefore, the all-decimal zone selector unit 61 may have, for subtraction, a tooth 245 broadened sufficiently as to its cam-plate-dwell-engaging portion, as will be apparent in Figure 1, to keep the short-dwell subtraction cam plate 238 depressed until the jack engaging tappet 66 of said unit 61 leaves the last denomination jack 73 relative to the all-decimal computing zone.

At the final carriage step, from a computing zone, by which the jack tappet 66 or 66F leaves the last jack, 73 or 75, a cycling trip lever 247 pivoted at 248 to the cam plate housing 78 is rocked to depress a cycling jack 249, the latter being articulated to said lever 247 at 250, Figure 8, and being mounted in the housing 78 for vertical movement like the other jacks 73, etc., but being shorter at its top end so as not to be engageable by said tappets.

The cycle tripping train from said trip lever 247 is shown substantially like in said Pitman application No. 72,348 and, briefly described, further includes a thrust rod 251, Figure 8, and a bell crank 252 fulcrumed on the rod 88. Said bell crank 252 engages an arm 253 connected by a yoke 254 to an arm 255, said arms 253, 255 being rotatably loose on the rock shaft 135. Said arm 255 engages an arm 256, Figure 5, of the clutch trip shaft 215 in the computing base. Thus, rocking of the cycle trip lever 247 results in rocking said trip shaft 215 for an ensuing cycle of the general operator mechanism. The selector unit 61, for an all-decimal computing zone, has a cycle-trip-controlling tooth 258, Figure 8, adapted, relatively to the jack tappet 66, to engage a nose 259 of the trip lever 247 so as to rock the latter as the carriage takes said final step wherein said jack tappet 66 leaves the last denomination jack, 73.

The selector unit 61F, for a quantity-fraction computing zone, has attached to its side a plate 260, Figure 7, which may be bent under said unit as at 261 to form a trip tooth 262, the latter being thus adapted, relatively to the tappet 66F, to engage the trip lever nose 259 and rock the trip lever 247 to effect automatically an operation of the cycling mechanism as the carriage takes the final step wherein said tappet 66F leaves the last jack, 75, for said quantity-fraction zone.

With the carriage at the position in which the jack 75 is depressed, the left shift key 167 (Fraction key) may be depressed, it will be remembered, to shift the platen to upper case position preparatory to typing and indexing the upper case fractions. It will be further remembered that the depression of said left shift key 167 concomitantly causes withdrawal of the connector bar 154 to release the secondary jack 158 that, otherwise, remains depressed along with said jack 75 to lock all the digit key levers 25. All the ten digit key levers 25, from "0" to "9", thus become unlocked in that the all-digit-keys-locking interponent 140, is withdrawn at the release of the secondary jack 158. It is desired, however, to have the "8," "9" and "0" digit key levers locked again in order to prevent inadvertent use thereof when the carriage is at the fraction typing denomination. An auxiliary key locking mechanism devised for this purpose and controllable by said same jack 75 so as to be effective only on said "8", "9" and "0" digit key levers at the fraction typing and indexing position of the carriage will now be described, see Figures 9, 10 and 12.

The distributive rack 150 for the fraction denomination is slightly advanced, it will be remembered, to pin-settable position by depressing the jack 75. Said rack 150 has an upright arm 264 having a pin-and-slot connection 265 to an arm 266 fixed to a transverse rock shaft 268 journaled in brackets 269 shown mounted on bars 270 of the frame 114. Another arm 272 fixed to said rock shaft 268 is pivoted to a forwardly extending link 273 slidably supported at its forward end as at 274 by the pin-setting-linkage frame 138, Figure 9. Said link 273 may be articulated as at 275 to a bell-crank 276 pivoted at 277 to a bracket 278 on said frame 138. Said bell crank 276 has a pin and slot connection 271 to a key locking bar 281 slidably retained, for endwise movement, on said frame 138 as at 282, 283, and is shown with three clearance notches 284 that in a normal position of said key locking bar 281 permit downward passage of spurs 285 provided only on the key lever rods 141 for the key levers for "8", "9" and "0".

It will be perceived now that at depression, by the carriage, of the jack 75, the latter operates through the described train, from the distributive rack 150, to shift said key locking bar 281 endwise to the left sufficiently so that key locking portions 279 thereof, to the right of said clearance notches 284 come under the spurs 285, as in Figure 9, and thus prevent depression of the key levers for "8", "9" and "0". The locking bar 281 may slidably rest on supports 280, on the frame 138, underlying the key-locking portions 284. Thus, when the left shift key 167 is depressed, causing the secondary jack 158 to be released so that all the digit key levers 25 become unlocked as far as the all-key-lever locking interponent 140 is concerned, it will, nevertheless, be only the seven key levers for the seven upper case fractions "⅛" to "⅞" that will be operative since the jack 75 remains depressed, causing the key locking bar 28f to lock the other three key-levers, for "8", "9" and "0".

*Operation*

Considering, for example, the work sheet, Figure 6, the carriage may be tabulated leftward, as from the usual margin stop (not shown), to the highest denomination position for the "Amount" to be typed in the first column. The appropriate denomination tabulating key 52 is therefore used and its companion denomination stop 53 cooperates with the column stop 65 of the selector unit 61 provided on the carriage for the "Amount" column. The amount such as 3 426 76 is then typed and the corresponding pins 45 are concomitantly set in the appropriate all-decimal register bar set selected by means of the tooth 67 placed on said unit 61 to depress the appropriate register selecting cam plate, such as 100 for the right-hand register. During the typing of the amount the tappet 66 of said unit 61 traverses all of the jacks 73, 74, 75 to advance the register bars 41 of the selected set seriatim to pin settable positions, and it results that the appropriate pins 45 are set to set up the amount in said register bar set.

At the punctuation-space carriage position corresponding to the jack 74, the latter is depressed to cause all the digit key levers 25 to be locked to compel the space key 29 to be operated for the first punctuation-space for said amount. Similarly, at the punctuation-space carriage position corresponding to the jack 75, the latter will be depressed and, concomitantly, the secondary jack 158 will be depressed to cause all the digit key levers 25 to be locked to compel operation of the space key 29, it being noted that at said second punctuation space for the all-decimal computing zone the secondary jack 158 is not released since the all-decimal amount is typed when the platen is at lower case position.

As the carriage leaves the last jack 73, the trip tooth 258 of said unit 61 functions to trip the cycling mechanism to cycle the indexed register bars 41 to accumulate the index "Amount" in the selected right hand register.

The carriage is now tabulated for the second or "Quantity" column of said work sheet. The arrangement is such that the order in which the tabulating keys are used is the same for the fraction including amount, as for the all-decimal amount. Thus, the "thousands" tabulating key 52 is used for tabulating the carriage to the "thousands" position for either an all-decimal column or a quantity fraction column. Similarly, the "hundreds" tabulating key 52 is used for tabulating the carriage to the "hundreds" position for either kind of column, and so on. If desired the denomination tabulating mechanism may include a tabulating key 52 and stop 53 for the punctuation space corresponding to the jack 75 as for tabulating the carriage directly to the position to type an amount consisting only of a fraction such as "⅞".

The carriage having been tabulated to the appropriate denomination for typing in the second or "Quantity" column, the quantity such as 1 468⅞, Figure 6, may be typed. For indexing the quantity in the register bars 41, 145 for the quantity-fraction register, namely, the first register from the left of Figures 1 and 10, the carriage is provided with a selector unit 61F having the jack engaging tappet 66F and the tooth 67 for depressing the fraction register selecting cam plate 98. At the first punctuation space position of the carriage relative to said quantity 1 468⅞, the tappet 66F depresses the jack 74 causing all the digit key levers 25 to be locked to compel operation of the space key 29. At the typing of the decimal digits 1 468, of said quantity, the tappet 66F operates the corresponding jacks 73 seriatim to advance the corresponding register bars 41 consonantly with indexing said decimal digits therein. Upon typing the last decimal digit, "8", the carriage takes its letter feed step to and depresses the jack 75, and, along with the depression of said jack 75, the secondary jack 158 is depressed by means of the connector bar 154 to lock all of the digit key levers 25.

This locking of all the key levers at the carriage position corresponding to the jack 75 apprises or signals the typist, should she attempt to type the fraction without case shifting, that she must first shift the platen to upper case by depressing the left case shift key 167 whereupon the connector bar 154 will have been withdrawn to release the secondary jack 158 to withdraw the all-key-levers-locking interponent 140. The jack 75, however, remains depressed by the tappet 66F to slightly advance the fraction register bar 145 to pin-settable position, and through the depressed jack 75 the auxiliary key locking bar 281 is in its leftward shifted position, Figure 9, to lock the last three key levers 25, namely, the key levers for "8", "9", "0". The appropriate one of the seven key levers 25 is operated to type, say, the "⅞" of said quantity and the seventh pin 45 in the register bar 145 is thereby caused to be set. It may be noted here that said register bar 145 need have only eight index pins, namely, seven of the pins 45 and a zero pin 45°.

At the letter feed carriage step following typing and indexing the "⅞", the trip tooth 262 of the unit 61F actuates the trip lever 247 to cycle the general operator mechanism to actuate the register bars 41, 145 of the quantity fraction register to accumulate the indexed quantity-fraction in the computing wheels 40, 81 of that register. The left hand shift key 167 may be released, of course, upon typing the fraction "⅞" and the resulting restoration of the shift rail frame 172 restores the connector-bar 154 to re-connect operatively the jack 75 and secondary jack 158. To facilitate the re-connection the connector bar may have a camming-bevel 286, Figure 5.

As the tappet 66F leaves the jack 75 the latter becomes restored as by means of a spring such as 287 connected to the master rack 148. The other master racks 90 may have similar springs for restoring their companion jacks; and the cycle tripping train, from the trip lever 247, and the register selecting trains from the cam plates 98—100, may also have suitable restoring springs (not shown).

Following the "Quantity" entry, the carriage may be tabulated for typing in the third or "Deduction" column of said work sheet, there being provided for this column a selector unit 61 on the carriage, said unit having tooth 67 to select the cam plate 100 in which the amount was entered and also having a subtraction tooth 67S for determining subtraction of the deduction from said register according to known practice in this type of machine.

The "Net amount" typed in the fourth column of the work sheet may be read from the right hand register and there may be provided on the carriage a selector unit such as 61 for causing said amount to be indexed and entered in say the middle one of the three registers shown.

It will be understood that during each cycling operation, the computing wheels of the selected register are shifted to mesh and unmesh with the register bar racks such as 43 or with the idlers such as 42 depending, respectively, on addition or subtraction. Each register may be provided with carry-over means (not shown) since said means may be of the kind shown in said Pitman Patent 1,927,951. During the cycling operation the set index pins 45 are caused to be restored as in said Pitman Patent 1,927,951. Each register bar, 41, 145 is shown with a "0" pin 45° that is normally depressed and each register bar may have means, as in Patent No. 2,075,557, to O. Thieme, dated March 30, 1937, whereby the depression of a higher pin 45 restores the depressed zero pin 45°. Conversely, re-depression of the zero pin 45° restores any depressed higher pin 45; and therefore, the pin restoring means being operative during the cycle to depress again all the zero pins 45° that had become restored during the pin-setting operation.

Variations may be resorted to within the scope of the invention, and portions of the improvements may be used without others.

What is claimed is:

1. In a combined typewriting and computing machine having a plurality of registers, the combination with a set of digit type-keys, a typing carriage controlled by said keys, and a plurality of selectable sets, one set for each register, of indexable computing-wheel drivers of different denominations; of a single denominational series of jacks operable seriatim by said carriage to select the drivers of a selected set seriatim for digit-indexing operations controlled by said keys, key-locking means normally cooperative with a certain one of said jacks, as the latter is operated by said carriage, to lock said digit type-keys, and means operable at will to disable said key-locking means so as to suppress the key-locking function of said one jack, whereby to cause a certain one of said drivers to be indexed by means of one of said keys, means being provided to cooperate with said one jack to invariably select said one driver for the indexing operation independently of whether or not the keys are locked.

2. The combination with lockable digit-keys, and a step-by-step feeding carriage controlled by said keys, of a set of indexable computing-wheel drivers of certain denominations as, for instance, decimal denominations, a computing-wheel driver of a different denomination, as, for instance, a fraction denomination, a set of jacks engageable seriatim by the carriage to select the drivers for indexing them by means of said keys, one of said jacks being adapted to select the computing-wheel driver of said different denomination, means normally cooperative with said one jack when the latter is engaged by said carriage, to lock said digit-keys, whereby to prevent the indexing of said computing-wheel driver of different denomination, and means operable at will, to suppress the key-locking function of said one jack, whereby to permit indexing of said computing-wheel driver of different denomination.

3. A machine of the character described having, in combination, upper and lower case typewriter types, a platen, a letter-feed carriage cooperative with said types, case-shift mechanism associated with said types, a jack operable by said carriage to perform a certain function, a secondary jack operable to perform a certain different function, and a connector-device controlled by said case shift mechanism to enable, normally, said first jack, when operated by said carriage, to operate said secondary jack, said connector-device being responsive to operation of said case-shift mechanism to effect disconnection of said secondary jack from said first jack, whereby to suppress said different function.

4. In a combined typewriting and computing machine, the combination of a series of type keys controlling upper and lower case amount-printing types, a step by step feeding carriage cooperative with said types, a case-shift mechanism associated with said types, computing mechanism, including an indexable computing wheel driver and a jack operable by the carriage at a certain place in a computing zone of the carriage travel to render said driver indexable, said place representing a punctuation-space relative to the amounts printable at a zone by the lower case types and also representing a computing-denomination at which said driver is indexable relative to the amounts printable at a zone, by the upper case types, and a key locking mechanism controlled by said jack and the case shift mechanism so as to be operated by said jack to lock said keys at said place when typing an amount with the lower case types and so as to be inoperable by said jack at said place when typing an amount with said upper case types and indexing said driver.

5. Machine constructed according to claim 4, said case-shift mechanism including two case shift keys, and said machine including means responsive only to operation of one of said case shift keys, and not to operation of the other case shift key, to render said jack inoperable by the carriage when typing in upper case, said other case shift key being operable preparatory to typing the amount with the upper case types and concomitantly having said jack operable by said carriage.

6. In a combined typewriting and computing machine, in combination; typewriter mechanism including upper and lower case amount-printing types, keys for actuating said types, a letter-feeding carriage cooperative with said types, and a case-shift mechanism; a plural-register computing mechanism including a plurality of selectable sets, one set for each register, of computing wheel drivers, a series of jacks and sets of connections ramifying therefrom to the sets of drivers, a jack representing a punctuation-space position of the carriage relative to one of the registers, said latter jack having a connection to one of the drivers for the other register, computing zone tappets on the carriage for actuating said jacks to select the drivers of a pre-selected set seriatim for indexing by means of said keys; key-locking means, and means dependent on non-use or use of the case-shift mechanism to connect said key-locking means to said latter jack or to disconnect said key-locking means therefrom to cause said latter jack to lock said keys or to leave said keys unlocked when the carriage is at said position, said connection of said one driver to said jack being effective when said keys are unlocked.

7. In a combined typewriting and computing machine, in combination, typing keys, amount-printing types controlled by said keys, a letter-feed carriage cooperative with said types, a plurality of sets of computing-wheel drivers, said sets being selectable for indexing operations by said keys, a series of jacks operable by the carriage and adapted to select the drivers of a selected set for the indexing operations, one of said jacks constituting a punctuation-jack, but not a driver-selecting jack, relative to one of the sets of drivers and also constituting a driver-selecting jack relative to the other set of drivers, key-locking means normally actuatable by said one jack, and when the latter acts as a punctuation jack, to lock said keys, and means operable, preparatory to use of one of said types by means of its key at the carriage position whereat said one jack is operated, to render said key-locking means inoperable by said one jack.

8. In a combined typewriting and computing machine, in combination, typing-keys controlling upper and lower case types, a typing carriage, a case-shiftable part, a jack operable by the carriage to select a certain computing-mechanism element, a key locking mechanism, a secondary jack operable by means of said first jack to actuate said key locking mechanism, and a connector-device controlled by said case-shiftable part to determine connection or disconnection of said jacks.

9. In a combined typewriting and computing machine, in combination, type-keys controlling types for printing, for instance, a dollars-and-cents amount in which the cents are set off from the dollars by a punctuation space, a step-by-step feeding carriage, cooperative with said types and operable to step into and out of the punctuation-space position, type-key locking mechanism, a jack operable by the carriage at such position relative to different computing zones of the carriage travel, connections from said jack to select a certain indexable computing mechanism element and to also actuate said key locking mechanism, one or another said types being operable also at the jack operating position of the carriage, as for printing, and indexing in said element, a last figure, for instance, a fraction, of different order than such first amount, and means operable at will, preparatory to printing and indexing such last figure, to suppress operation of the key locking mechanism by said jack.

10. In a combined typewriting and computing machine, in combination, digit type keys, a letter feed carriage cooperative with said keys, a set of jacks including carriage-operated computing-wheel-driver-selecting jacks and also including two jacks corresponding to punctuation space positions of the carriage relative to said driver-selecting jacks, a key locking mechanism operable by means of one of said two jacks, the other of said two jacks being adapted to serve as a computing-wheel-driver-selecting jack, and a differentially conditionable connection normally conditioned to enable said latter jack to operate said key locking mechanism, said connection being conditionable to disconnect the key locking mechanism from said latter jack.

11. In a machine of the character described, the combination with lockable digit-keys, and a step-by-step feeding carriage controlled by said keys, of a jack operated by the carriage at a certain position thereof to effect a certain function concomitantly with operation of said keys, key-locking means, a differentially conditionable connector-device normally conditioned to enable said jack to operate said key-locking means whereby, ordinarily, to prevent operation of any key at said position, and means operable to condition and thereby disable said connector-device to disable said key-locking means preparatory to using any one of said digit-keys at said position, said latter means being inoperative to disable said function of said jack.

12. In a machine of the character described, the combination with lockable digit-keys, and a step-by-step feeding carriage controlled by said keys, of a jack operated by the carriage at a certain position thereof to effect a certain function concomitantly with operation of a certain part of said keys, means operable to lock simultaneously all of said keys, a differentially conditionable connector-device normally conditioned to enable said jack to operate the all-keys-locking-means whereby, ordinarily, to prevent operation of any key at said position, means operable to condition and thereby disable said connector-device to disable said all-keys-locking means preparatory to using said certain part of said keys and effecting said function at said position, and an auxiliary locking-device responsive to said jack at said position to lock the remaining part of said keys.

13. In a combined typewriting and computing machine, in combination, typing-keys controlling upper and lower case types, a typing carriage, a case-shiftable part, a computing wheel driver selectable for an indexing operation by means of said keys, a jack operable by the carriage to select said driver, a key locking mechanism, and a connector-device controlled by said case-shiftable part to determine connection or disconnection of said jack and key locking mechanism, said jack being effective to select said driver when said jack and key locking mechanism are disconnected.

14. In a combined typewriting and computing machine, in combination, type keys, upper and lower case types controlled by said keys, a letter feed carriage cooperative with said types, a case shift mechanism, said types being operable in lower case to print, for instance, a dollars-and-cents amount in which the cents are set off from the dollars by a punctuation space, the upper case types being operable to print an amount figure at a carriage position corresponding to said punctuation space, a jack operable by the carriage to select a computing element to be indexed for said upper case amount figure, said jack serving also as a punctuation space jack operable by the carriage relative to the lower case typing, and a key locking mechanism operatively connected to said jack and controlled by said case shift mechanism to enable said one jack, when operated by the carriage, to lock said keys when the lower case types are being actuated and to render said keys unlocked without affecting the computing-element-selecting function of said jack when said case shift mechanism is actuated for upper case typing.

15. In a machine of the character described having key operated indexers, a carriage feeding step by step at operation of said indexers, and two registers, each including a set of computing wheels and indexable drivers therefor movable individually into index-receiving position relatively to said indexers, one register being adapted for computing amounts in one order of denominations and the other register being adapted for computing amounts in a different order of denominations; driver selecting mechanism, controlled by said carriage, comprising a single row of driver-moving jacks encompassing both orders of denominations, some of said jacks being common to both registers, two members, one for each set of drivers, selectively displaceable by the carriage at a computing zone, one member having connections effective at displacement of said member to operatively connect its drivers to one order of said jacks and the other member having connections effective at displacement of said other member to operatively connect its drivers to the other order of jacks, said carriage including tappet means to displace one or the other of said members at a computing zone, and said carriage also including tappet means arranged relatively to said jacks to actuate the appropriate order of jacks at said zone.

WALTER T. SAGNER.

CERTIFICATE OF CORRECTION.

Patent No. 2,186,347.  January 9, 1940.

WALTER T. SAGNER.

It is hereby certified that error appears in the printed specification of the above numbered patent requiring correction as follows: Page 10, first column, line 7, claim 3, for "comhbination" read combination; and second column, line 20, claim 7, for "and when" read as when; and that the said Letters Patent should be read with this correction therein that the same may conform to the record of the case in the Patent Office.

Signed and sealed this 13th day of February, A. D. 1940.

(Seal)

Henry Van Arsdale,
Acting Commissioner of Patents.